United States Patent [19]
Kerth et al.

[11] Patent Number: 5,717,321
[45] Date of Patent: Feb. 10, 1998

[54] DRIVE CURRENT CALIBRATION FOR AN ANALOG RESISTIVE TOUCH SCREEN

[75] Inventors: Donald A. Kerth; Brian D. Green, both of Austin, Tex.

[73] Assignee: Cirrus Logic, Inc., Fremont, Calif.

[21] Appl. No.: 373,009

[22] Filed: Jan. 17, 1995

[51] Int. Cl.[6] ............................................. G05F 1/10
[52] U.S. Cl. ........................................ 323/283; 323/285
[58] Field of Search .................................. 323/283, 285; 340/397; 341/120

[56] References Cited

U.S. PATENT DOCUMENTS

| | | | |
|---|---|---|---|
| 4,272,760 | 6/1981 | Prazak et al. | 340/347 CC |
| 4,336,526 | 6/1982 | Weir | 340/347 |
| 4,340,882 | 7/1982 | Maio et al. | 340/347 |
| 4,381,495 | 4/1983 | Hotta et al. | 340/374 |
| 4,626,769 | 12/1986 | Valley et al. | 323/283 |
| 4,761,725 | 8/1988 | Henze | 363/46 |
| 4,940,981 | 7/1990 | Naylor et al. | 341/161 |
| 4,943,807 | 7/1990 | Early et al. | 341/120 |
| 5,008,854 | 4/1991 | Maeda et al. | 364/900 |
| 5,016,014 | 5/1991 | Bitting | 341/162 |
| 5,027,116 | 6/1991 | Armstrong et al. | 341/120 |
| 5,087,914 | 2/1992 | Sooch et al. | 341/120 |
| 5,248,970 | 9/1993 | Sooch et al. | 341/120 |
| 5,327,163 | 7/1994 | Hashimoto | 345/173 |
| 5,429,105 | 7/1995 | Bennett et al. | 123/693 |

OTHER PUBLICATIONS

Ginetti et al., "A CMOS 13-b Cyclic RSD A/D Converter," IEEE Journal of Solid-State Circuits, vol. 27, No. 7, Jul. 1992, pp. 957–965, IEEE, New York, N.Y.

Ohara et al., "A CMOS Programmable Self–Calibrating 13–bit Eight–Channel Data Acquisition Peripheral," IEEE Journal of Solid State Circuits, vol. SC–22, No. 6, Dec. 1987, pp. 930–938, IEEE, New York, N.Y.

"Working Concepts –Bradytouch Analog Resistive Touch Panel," Thin Film Products/Application Notes, 1991, W.H. Brady Co., 8225 W. Packard Ct., P.O. Box 571, Milwaukee, WI.

Maio et al., "An Untrimmed D/A Converter with 14–Bit Resolution," IEEE Journal of Solid–State Circuits, vol. SC–16, No. 6, Dec. 1981, pp. 616–620, IEEE, New York, N.Y.

Primary Examiner—Peter S. Wong
Assistant Examiner—Rajnikant B. Patel
Attorney, Agent, or Firm—Richard Auchterlonie; J. P. Violette

[57] ABSTRACT

An analog resistive touch screen is powered by a current source responsive to a stored digital control value. The current source is calibrated by comparing the excitation voltage across the touch screen to a desired voltage to produce a comparison signal, and adjusting the digital control value in response to the comparison signal so that the excitation voltage becomes substantially equal to the desired voltage. The power supply can therefore be easily constructed in a low-voltage CMOS integrated circuit having a minimal power consumption without sacrificing touch screen resolution. Preferably the comparison of the excitation voltage to the reference voltage is performed by an analog-to-digital converter that is later used in a normal conversion mode for digitizing the touch screen coordinates. Moreover, because the touch screen presents a different load resistance depending on whether a first resistive sheet is energized for measuring an X coordinate or a second resistive sheet is energized for measuring a Y coordinate, a separate calibration is performed for each of the two resistive sheets, and the digital control value from each calibration is stored in a separate register for selective retrieval to measure either an X coordinate or a Y coordinate.

32 Claims, 7 Drawing Sheets

DRIVE CURRENT CALIBRATION FOR AN ANALOG RESISTIVE TOUCH SCREEN

BACKGROUND OF THE INVENTION

1. Field of the Invention

The present invention relates generally to power supplies, and more particularly to a power supply for an analog resistive touch screen. The present invention specifically relates to a method of calibrating a current source that energizes an analog resistive touch screen.

2. Description of the Background Art

An analog resistive touch screen consists of two opposing transparent resistive layers separated by insulating spacers. Actuation with a finger or stylus brings the two opposing resistive layers into electrical contact, which can then be measured as a switch closure. Accurate position information can also be obtained by measuring resistive levels along both an X and Y axis. Such an analog resistive touch screen is commercially available from W. H. Brady Co., Thin Film Products, 8225 W. Parkland CT, P.O. Box 571, Milwaukee, Wis. 53201. Typically the two opposing resistive layers in the analog resistive touch screen are made of sputtered indium tin oxide film. It is difficult to precisely control the resistivity of the resistive layers. For example, the resistive layers of the analog resistive touch screens from the W. H. Brady Co. typically have resistivities of between 150 and 500 ohms per square.

The analog resistive touch screen is typically overlaid on a display device for use as a graphical input/output unit for a microcomputer. See, for example, Maeda et al., U.S. Pat. No. 5,008,854, issued Apr. 16, 1991, and incorporated herein by reference. Maeda et al. describes a pocket-size data storage apparatus including a transparent analog resistive touch screen overlaid on a dot matrix display. Image data is input from the analog resistive touch screen and displayed on the dot matrix display.

When an analog resistive touch screen is overlaid on a dot-matrix display, it is known that the driving of the display unit can cause noise to be picked up from the analog resistive touch screen. As described in Hoshimoto et al., U.S. Pat. No. 5,327,163, issued Jul. 5, 1994 and incorporated herein by reference, an actuated position on the analog resistive touch screen can be sampled by an analog-to-digital converter, and the sampling can be synchronized with the display driving signal so as to minimize the pickup of noise from the display.

There are two conventional methods for energizing an analog resistive touch screen. The touch screen is energized either with a constant voltage or a constant current. In either case, the resolution of the display is typically limited by an effective input noise voltage to the analog-to-digital converter, and this effective input noise voltage is relatively independent of the resistivity of the analog resistive touch panel. Consequently, a maximum resolution can be obtained by energizing the display with a maximum constant voltage. The constant voltage drive, however, typically wastes power because a class A driver is typically used that must be biased for the lowest acceptable tablet resistance. For screens that have higher resistance, the excess bias current is wasted.

In contrast, for the constant current method, the current needs to be set to accommodate the maximum resistance so as not to saturate the analog-to-digital converter. For the minimum screen resistance, however, the screen voltages are low and, therefore, prone to noise.

Consequently, for either a constant voltage or a constant current power supply, the variation of screen resistance causes difficulties. Further difficulties are present when it is desired to use low voltage integrated circuitry for energizing the analog resistive touch screen. For such low voltage integrated circuitry, the variation of process parameters such as transistor threshold voltages can be very significant with respect to the desired excitation voltage. Moreover, such low voltage circuitry has relatively poor power supply noise rejection capabilities. Therefore, it is relatively difficult to use low-voltage complementary metal-oxide-semiconductor (CMOS) integrated circuit technology for fabricating a low-power constant voltage driver for the analog resistive touch screen.

SUMMARY OF THE INVENTION

The basic objective of the present invention is to provide a method and system for calibrating a power supply for an analog resistive touch screen in such a way as to compensate for variations in touch screen sheet resistance and process parameters of low voltage CMOS integrated circuit technology.

A specific objective is to calibrate a power supply for an analog resistive touch screen in such a way as to maximize the power supply noise rejection capability.

In accordance with a basic aspect of the invention, there is provided a method for controlling power supplied to a load resistance, such as the resistance of a resistive sheet in an analog resistive touch screen. The method comprises the steps of: converting a digital control value to a current supplied to the load resistance, to thereby produce a voltage across the load resistance; comparing the voltage across the load resistance to a desired voltage to produce a comparison signal; and adjusting the digital control value in response to the comparison signal so that the voltage across the load resistance becomes substantially equal to the desired voltage.

Preferably the voltage across the load resistance is compared to the desired voltage by applying the voltage across the load resistance and a reference voltage to an analog-to-digital converter to produce a digitized value, and producing the comparison signal from the digitized value. The comparison signal, for example, is produced by comparing the digitized value to a digital full scale value of the analog-to-digital converter. After the power supply is calibrated, the analog-to-digital converter can be used for other purposes, such as digitizing a screen voltage from a touch screen to produce a digital coordinate value.

Preferably the digital control value is adjusted in response to the comparison signal by successively adjusting individual bits of the digital control value beginning with a more significant bit of the digital control value and ending with a less significant bit of the digital control value. Such a successive approximation procedure rapidly adjusts the digital control value so that the voltage across the load resistance becomes substantially equal to the reference voltage.

Preferably the step of converting a digital control value to a current supplied to the load resistance includes converting the digital control value to a control current and reflecting the control current in a current mirror supplying the current to the load resistance. The current mirror has an amplifier controlling the current supplied to the load resistance. In this case the current mirror provides good power supply noise rejection capability. Such a current mirror is easily constructed in a low-voltage CMOS integrated circuit having a minimal power consumption.

Typically an analog resistive touch screen presents a different load resistance depending on whether a first resistive sheet is energized for measuring an X coordinate or a second resistive sheet is energized for measuring a Y coordinate. In accordance with another aspect of the invention, a separate calibration is performed for each of the two resistive sheets, and the digital control value from each calibration is stored in a separate register for selective retrieval to measure either an X coordinate or a Y coordinate.

The present invention provides specific methods and apparatus for practicing the invention with an analog resistive touch screen and an analog-to-digital converter having an analog voltage input and a reference voltage input. The present invention also provides circuitry for either ratiometric or non-ratiometric operation.

While the invention is susceptible to various modifications and alternative forms, specific embodiments thereof have been shown by way of example in the drawings and will be described in detail herein. It should be understood, however, that it is not intended to limit the invention to the particular forms disclosed, but on the contrary, the intention is to cover all modifications, equivalents, and alternatives falling within the scope of the invention as defined by the appended claims.

DETAILED DESCRIPTION OF THE PREFERRED EMBODIMENT

Figure 1:
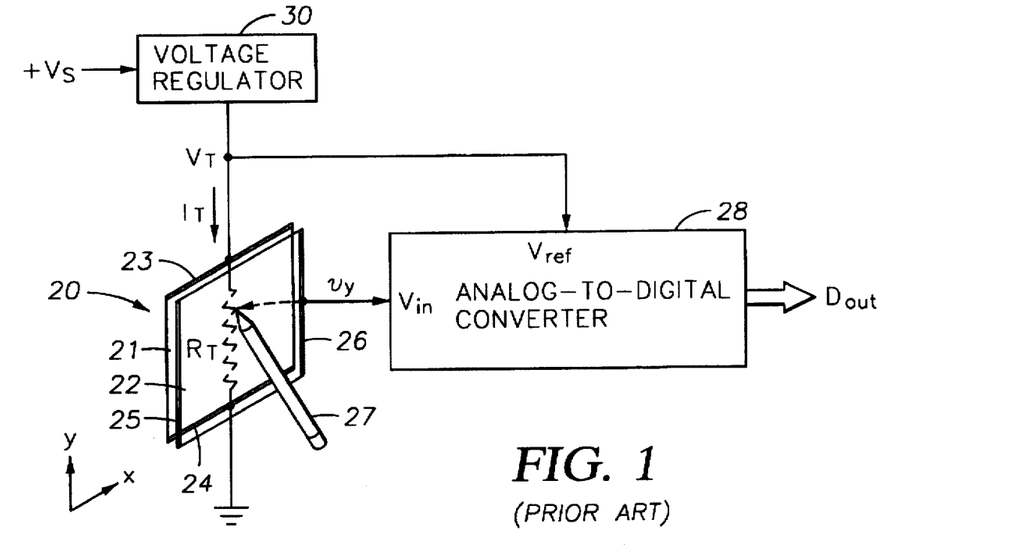
FIG. 1, labelled prior art, shows the conventional method of energizing an analog resistive touch screen with a constant voltage.

Turning now to FIG. 1, there is shown a conventional method of energizing an analog resistive touch screen generally designated 20 such that the excitation voltage $V_T$ across the analog resistive touch screen is constant. The analog resistive touch screen 20 includes a lower sheet 21 and an upper sheet 22. The lower sheet 21, for example, is a sheet of plastic or glass having sputtered on its upper surface a thin film of indium tin oxide having a sheet resistance of between 150 and 500 ohms per square. The indium tin oxide film is electrically connected to an upper bus bar 23 and a lower bus bar 24 which are each formed of silver ink which is about 1000 times more conductive than the indium tin oxide film. The indium tin oxide film provides a resistance $R_T$ between the upper bus bar 23 and the lower bus bar 24. As shown in FIG. 1, the upper bus bar 23 is energized by the voltage $V_T$, and the lower bus bar 24 is at ground, so that a current $I_T$ flows through the indium tin oxide film and causes a voltage gradient to be dropped across the resistive material.

The upper sheet 22 is made of transparent and somewhat flexible polyester or mylar film, and the bottom surface of the upper sheet 22 also has a sputtered indium tin oxide film extending from a left bus bar 25 to a right bus bar 26. When an operator (not shown) presses a stylus 27 against the upper sheet 22, the stylus presses a point of the upper sheet 22 into contact with the lower sheet 21, so that an electrical contact is made between the two resistive films. Therefore, a voltage $v_y$ appears on the right bus bar 26, and the voltage $v_y$ is proportional to the position of the point of the stylus 27 between the upper bus bar 23 and the lower bus bar 24.

To obtain a digital value indicating the position of the point of the stylus 27, an analog-to-digital converter 28 has an analog voltage input $V_{in}$ receiving the voltage $v_y$ and a provides a corresponding digital output $D_{out}$. So that the digital output $D_{out}$ will have a value between zero and digital full scale (DFS) corresponding to a selected position on the touch screen 20 ranging from the lower bus bar 24 to the upper bus bar 23, the analog-to-digital converter has a reference voltage input $V_{ref}$ receiving the voltage $V_T$ applied to the touch screen 20. This mode of operating the analog-to-digital converter is known as a ratiometric mode, since the digital output $D_{out}$ represents the ratio of the input voltage $V_{in}$ to the voltage $V_T$ applied to the touch screen 20. This ratiometric mode of operation insures that the output $D_{out}$ is relatively independent of low frequency variations of the applied voltage $V_T$.

As shown in FIG. 1, the voltage $V_T$ is supplied by a voltage regulator 30 which drops a supply voltage $+V_S$ to a substantially constant voltage, which is the voltage $V_T$ across the touch screen 20. The analog-to-digital converter 28 has a resolution set by quantization noise, 1/f noise, or power supply noise rejection capability. This resolution is voltage dependent and relatively independent of the resistance $R_T$ of the touch screen 20. Therefore, in order to achieve the best screen resolution, the voltage regulator 30 should be constructed so that $V_T$ is a relatively large fraction of the supply voltage $+V_S$. In practice, however, the voltage $V_T$ must be significantly less that the supply voltage $+V_S$ to obtain a reasonable level of power supply noise rejection. In the example of FIG. 1, power supply noise rejection refers to the ability of the voltage regulator 30 to prevent variation or noise on the supply voltage $+V_S$ from appearing on the excitation voltage $V_T$.

The constant voltage method shown in FIG. 1 is problematic when the power supply voltage $+V_S$ is relatively low (three volts or less) and the voltage regulator 30 is fabricated in CMOS integrated circuit technology. The voltage regulator 30 is typically a class A circuit since class AB circuits usually involve complicated control circuitry. If the voltage regulator 30 contains a class A circuit, then it must be biased for the lowest acceptable screen resistance $R_T$. For touch screens that have higher resistances, this excess bias current is wasted.

Figure 2:
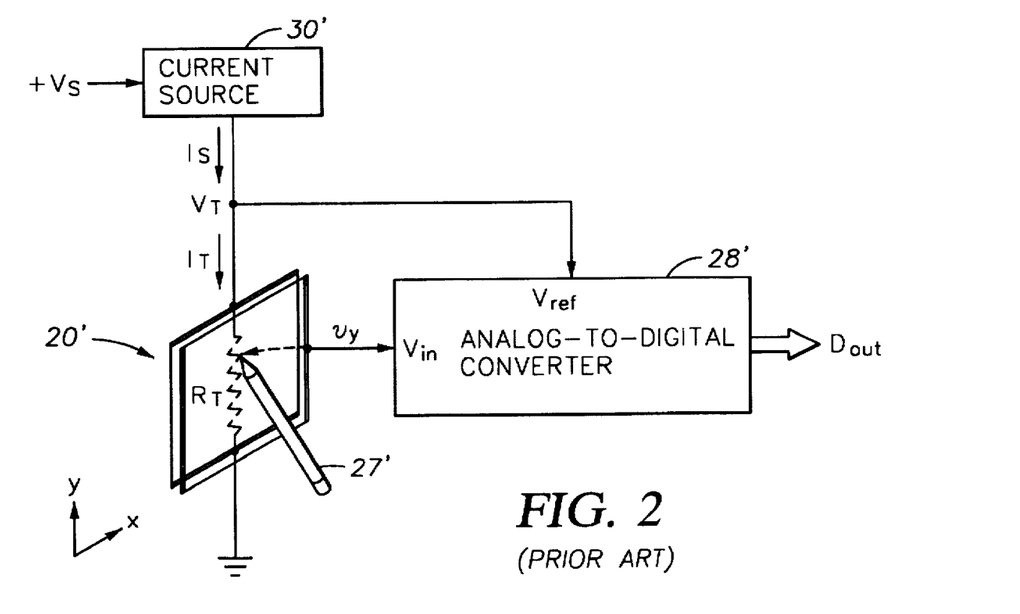
FIG. 2, labelled prior art, shows the conventional method of energizing an analog resistive touch screen with a constant current.

Turning now to FIG. 2, there is shown the conventional method of energizing an analog resistive touch screen 20' with a constant current $I_T$. In this case, a current source 30' is powered by the supply voltage $+V_S$ and supplies a constant current $I_S$ to the touch screen 20'. The current $I_T$ through the screen resistance $R_T$ is virtually the same as the source current $I_s$ because the voltage reference input $V_{ref}$ of the analog-to-digital converter 28' has a very high input impedance. The sensed voltage $v_y$ is given by:

$$v_y = KI_T R_T$$

where K is a linear function of the pen position such that K is between zero and 1. Because the analog-to-digital converter receives the voltage $V_T$ on its reference voltage input $V_{ref}$, the analog-to-digital converter operates in a ratiometric fashion to remove any variations due to the current I or the resistance $R_T$. Therefore, the digital output $D_{out}$ is given by: $D_{out} = v_y/V_{ref} = K$.

The problem with the constant current method of FIG. 2 is that the sheet resistance of the indium tin oxide can vary over a range of at least two to one. The current $I_T$ has to be set to accommodate the maximum resistance so as not to saturate the analog-to-digital converter 28' and so that the voltage $V_T$ will always be significantly less than the power supply voltage $+V_S$ for acceptable rejection of power supply noise. In this case, for a minimum screen resistance $R_T$, the screen voltage $v_y$ is always low and therefore relatively small in comparison to the quantization, 1/f, or power supply noise in the analog-to-digital converter 28'. For example, for a full scale analog-to-digital converter input of 2 volts and a resistance $R_T$ ranging from 500 ohms to 1K ohms, the excitation current $I_T$ has to be set at 2 mA. If the thermal noise of the analog-to-digital converter is 350 μVrms, then the noise-free resolution of the touch screen is approximately 1 part in 1000 for the 1K ohm case:

| | | |
|---|---|---|
| $V_{FS}$ | = | (2 mA)(1 KΩ) = 2 V |
| $V_{n(p-p)}$ | = | (6)(350 μV) [for ±3σ] |
| | = | 2.1 mV |
| $V_{FS}/V_{n(p-p)}$ | ≅ | 1000 |

For a touch screen having a resistance $R_T$ of 500 Ω, though, this resolution drops by two times since the full scale screen voltage $v_y$ is now only one volt:

$$V_{FS} = (2\ mA)\ (500\ \Omega) = 1V$$

This example further demonstrates that it is always desirable to drive the touch screen at the highest possible voltage in order to achieve the best screen resolution.

Figure 3:
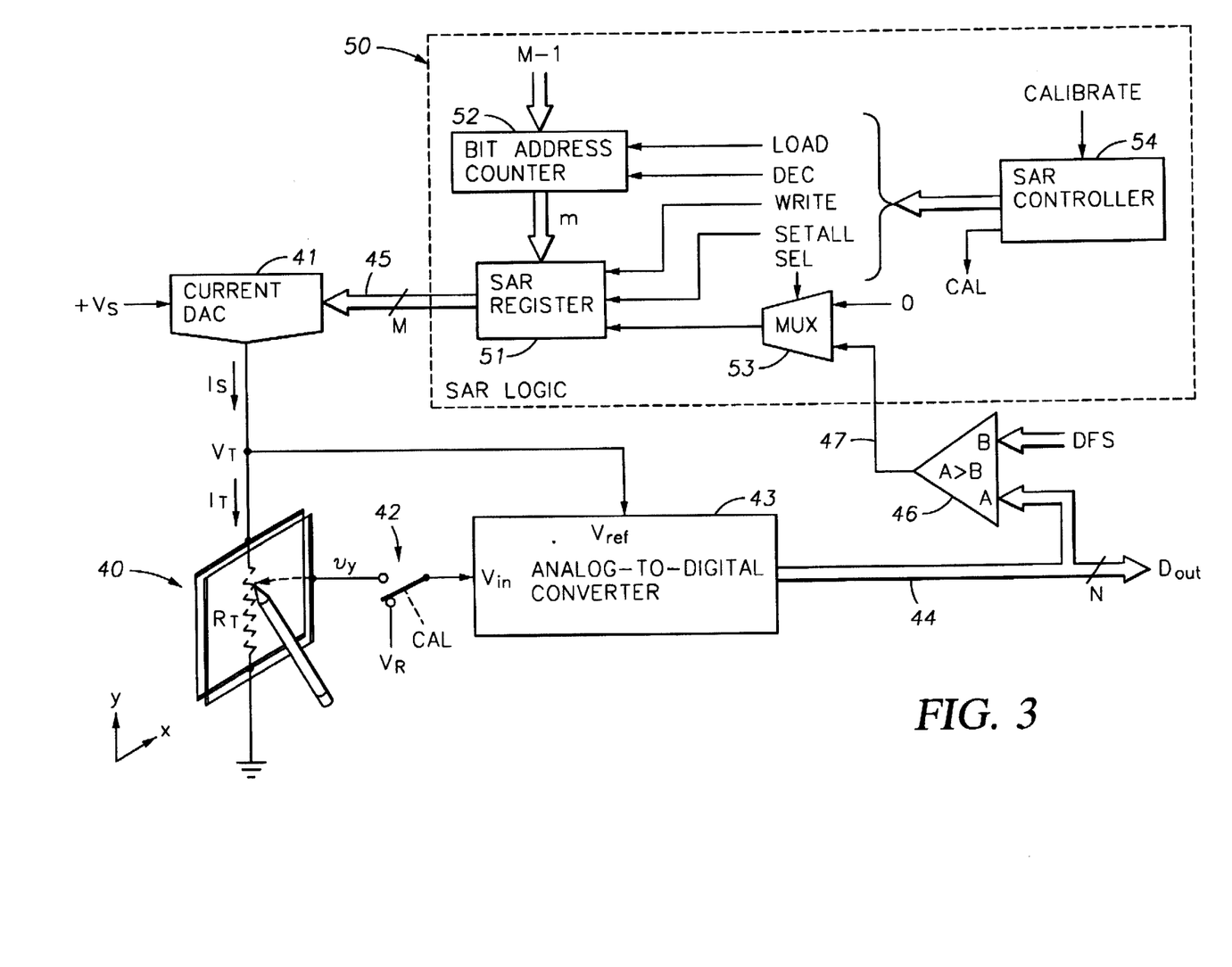
FIG. 3 is a schematic diagram showing a self-calibrating power supply for energizing an analog resistive touch screen at a selected constant current so that the voltage across the touch screen is substantially equal to a reference voltage.

Turning now to FIG. 3, there is shown a schematic diagram of an embodiment of the present invention. An analog resistive touch screen 40 is excited by current $I_T$ from a current digital-to-analog converter (DAC) 41. The current $I_T$ flows through the resistance $R_T$ of the touch screen 40 to generate an excitation voltage $V_T$. The current DAC 41 functions as a numerically adjustable current source. The current DAC 41 is powered by the supply voltage $+V_S$, and is controlled by a digital control value on a digital input bus 45. As indicated by the M and/symbol on the bus 45 in FIG. 3, the digital control value has M bits.

During a normal mode of operation, an analog multiplexer or switch 42 provides the screen voltage $V_y$ to the analog voltage input $V_{in}$ of an analog-to-digital converter 43. The analog-to-digital converter 43 also has a voltage reference input $V_{ref}$ that receives the excitation voltage $V_T$ to provide ratiometric operation. The analog-to-digital converter 43 converts the analog input voltage $V_{in}$ to a corresponding digital output $D_{out}$. The digital output $D_{out}$ has N bits on an output bus 44.

In accordance with an aspect of the present invention, a successive approximation technique is used during a calibration mode to adjust the current DAC 41 so that the excitation voltage $V_T$ across the touch screen 40 becomes substantially equal to a reference voltage $V_R$. In this calibration mode, the multiplexer or analog switch 42 applies the reference voltage $V_R$ to the analog input $V_{in}$ of the analog-to-digital converter 43. A numerical comparator 46 compares the digital output $D_{out}$ to a digital full scale value (DFS) to provide a comparison signal on a line 47. The comparison signal on the line 47, for example, is a logic high when the digital output $D_{out}$ is greater than the digital full scale value (DFS), and is otherwise a logic low. The analog-to-digital converter 43 produces the digital full scale value when the analog-to-digital converter converts an analog input voltage $V_{in}$ substantially equal to the analog reference voltage $V_{ref}$. In a conventional analog-to-digital converter, for example, the digital full scale value occurs when all N bits of the digital output $D_{out}$ have a logic 1. The comparison signal 47 could be provided by a most significant bit that is internal to the analog-to-digital converter 43 and represents a bit that is one bit more significant than the most significant bit of the digital output $D_{out}$. In a specific example, the analog-to-digital converter 43 provides two bits that are more significant than the most significant of the N bits providing the digital output $D_{out}$ in FIG. 3. These two bits are each inverted, and the two inverted bits are combined in a NAND gate to provide the comparison signal.

The analog-to-digital converter 43, for example, is an algorithmic converter having 12 bits of resolution, a conversion rate of 51.2 kHz, an integral nonlinearity of about 1 LSB, a differential nonlinearity of less than 1 LSB, and a power consumption of about 11 milliwatts (4 mA at 2.7 volts). Suitable algorithmic converters are described in Ohara et al., "A CMOS Programmable Self-Calibrating 13-bit Eight-Channel Data Acquisition Peripheral," IEEE Journal of Solid-State Circuits, Vol. SC-22, No. 6, December 1987, pp. 930-938, incorporated herein by reference; Ginetti et al., "A CMOS 13-b Cyclic RSD A/D Converter," IEEE Journal of Solid-State Circuits, Vol. 27, No. 7, July 1992, pp. 957-965, incorporated herein by reference; and Donald A. Kerth & Brian D. Green, U.S. patent application Ser. No. 08/372,094 filed concurrently herewith on Jan. 17, 1995 (Attorney Docket CRYS:020), entitled "Algorithmic Analog-to-Digital Converter Having Redundancy and Digital Calibration," incorporated herein by reference.

As shown in FIG. 3, successive approximation control logic generally designated 50 adjusts the M-bit control input to the current DAC 41 in response to the comparison signal on the line 47 so that the excitation voltage $V_T$ is adjusted towards and becomes substantially equal to the reference voltage $V_R$. The successive approximation logic 50 includes a successive approximation register 51, a bit address counter 52 that addresses a particular bit in the SAR register 51, a multiplexer 53 for selecting either a logic 0 or the comparison signal on the line 47 to be written into the address bit of the SAR register 51, and a successive approximation controller 54 for generating a number of control signals in FIG. 3. These control signals include the CAL signal which operates the analog multiplexer or switch 42, a load signal that loads the bit address counter 52 with a value M-1 pointing to the most significant bit in the SAR register 51, a DEC signal for decrementing the bit address counter 52, a write signal for writing the bit selected by the multiplexer 53 to the addressed bit position of the SAR register 51, a SETALL signal for setting all of the bits in the SAR register 51, and a SEL signal that is asserted so that the multiplexer 53 selects a logic 0 value. The multiplexer 53 can simply be an inverter for inverting the comparison signal on the line 47 and a NOR gate for combining the SEL signal with the inverted comparison signal.

The SAR controller 54 is responsive to a CALIBRATE signal to initiate a successive approximation calibration procedure. The CALIBRATE signal, for example, is asserted after a "power on" or a "chip reset". The touch screen current $I_T$ is successively adjusted by the successive approximation control logic 50 until the touch screen excitation voltage $V_T$ is substantially equal to the desired reference voltage $V_R$.

The calibration system of FIG. 3 permits the touch screen excitation voltage $V_T$ to be a maximum possible value irrespective of the touch screen resistance $R_T$ thus maximizing the touch screen resolution. The touch screen calibration system of FIG. 3 minimizes power consumption because virtually all of the current received by the current DAC from the supply voltage +$V_S$ is passed to the touch screen and appears as the touch screen current $I_T$. In other words, the current DAC is not operated as a class A voltage regulator. Moreover, the touch screen calibration system of FIG. 3 avoids implementing complicated class AB bias control circuitry in the analog domain. Instead of using Class AB control circuitry, the touch screen calibration system of FIG. 3 uses digital circuitry providing a bandwidth of control that is inversely related to the time interval between calibration requests. As will be further described below with reference to FIG. 8, the calibration system includes an amplifier in the current DAC 41 in order to provide a high level of power supply noise rejection.

Figure 4:
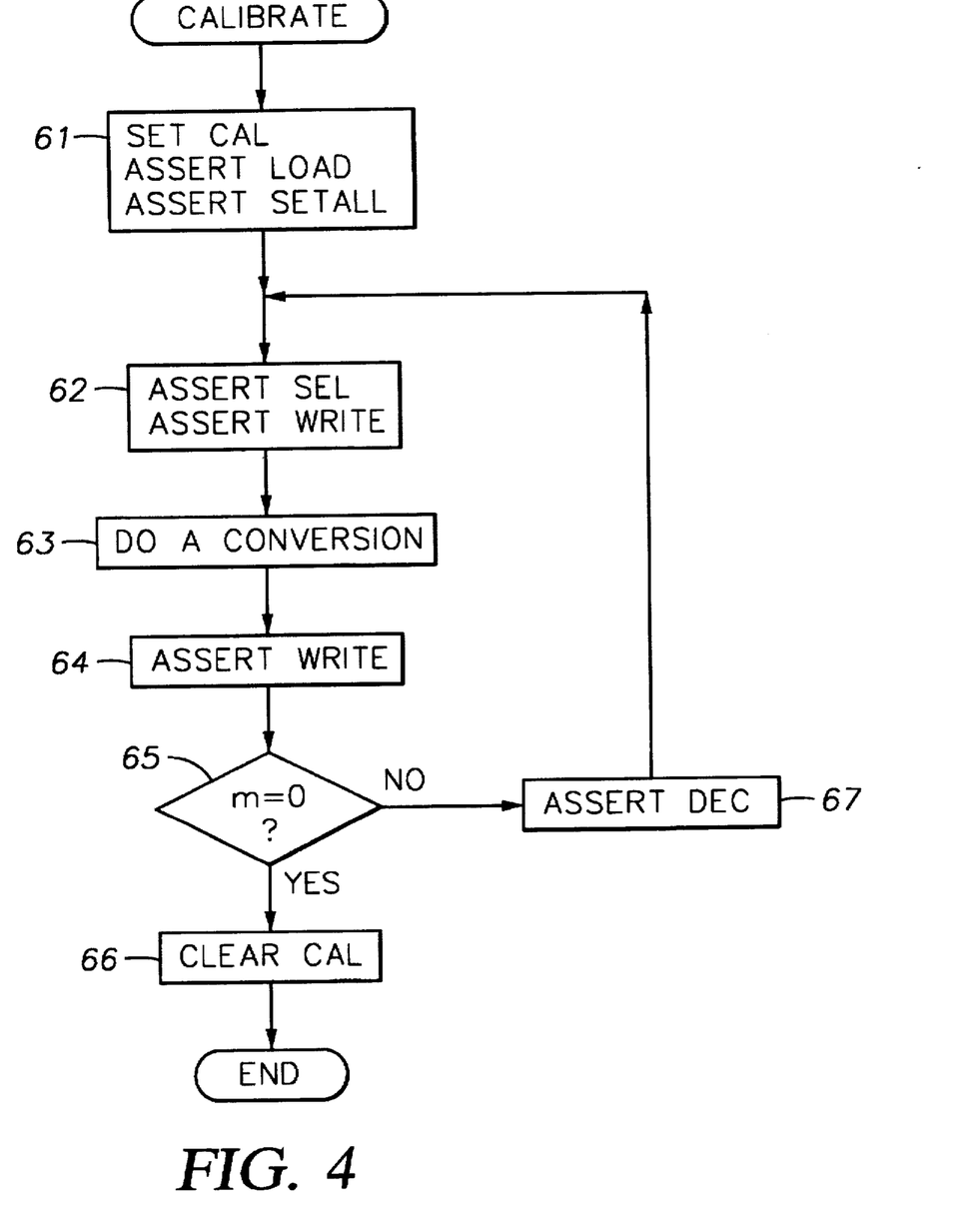
FIG. 4 is a flow chart showing a procedure followed by a successive approximation (SAR) controller shown in FIG. 3.

Turning now to FIG. 4, there is shown a flow chart of the calibration procedure performed by the SAR controller 54 in FIG. 3. The SAR controller 54, for example, is a state machine or microcontroller, and steps in the flow chart of FIG. 4 represent particular states of the state machine or microcontroller. The first step 61 is reached when the SAR controller 54 receives the CALIBRATE signal.

In step 61, the SAR controller sets the CAL signal so that the analog-to-digital converter 43 receives the reference voltage $V_R$ on its analog voltage input $V_{in}$. In step 61, the SAR controller also asserts the LOAD signal so that the bit address counter 52 is loaded with a value M-1 pointing to the most significant bit of the SAR register 51, and asserts the SETALL signal so that all of the bits of the SAR register are set.

For the comparator circuitry as described above, it is preferred to perform the successive approximation with all of the bits in the SAR register initially set, instead of all of the bits in the SAR register initially cleared. If all of the bits in the SAR register were initially cleared, the initial value of the analog input $V_{in}$ to the analog-to-digital converter 43 would be much greater than the initial value of reference voltage $V_{ref}$ which would cause an over-range condition that would interfere with the comparison circuitry. Alternatively, the comparison circuitry could be enhanced to detect the over-range condition, but it is easier to just perform the successive approximation with all of the bits in the SAR register initially set, so that an over-range condition does not occur that would interfere with the comparison circuitry.

During the next clock cycle of the SAR controller, the next step 62 is reached. In step 62, the SAR controller asserts the SEL signal and asserts the WRITE signal, so that a logic 0 is written into the addressed bit position of the SAR register 51. Initially, this addressed bit is the most significant bit of the SAR register. Then in step 63, the SAR controller 54 waits until the analog-to-digital converter 43 performs a conversion.

After the conversion is completed, in step 64, the SAR controller asserts the WRITE signal so that the comparison signal on the line 47 from the numerical comparator 46 is written into the addressed bit of the SAR register. Therefore, step 64 has the effect of setting the addressed bit in the SAR register when the digital output $D_{out}$ is greater than the digital full scale value, and otherwise the addressed bit of the SAR register remains a logic 0. In this regard, it should be noted that as the value in the SAR register is increased, the current DAC 41 increases the touch screen current $I_T$, thereby increasing the excitation voltage $V_T$, and increasing the reference voltage input $V_{ref}$ to the analog-to-digital converter 43. However, when the reference voltage input $V_{ref}$ to the analog-to-digital converter 43 is increased, the value of the digital output $D_{out}$ decreases. Therefore, step 64 of FIG. 4 tends to adjust the SAR register 51 so that the excitation voltage $V_T$ becomes closer to the reference voltage $V_R$.

In step 65, execution branches depending on whether the bit address counter 52 points to the least significant bit of the SAR register 51. If the bit address m is equal to zero, pointing to the least significant bit of the SAR register, then the next state is step 66 in which the CAL signal is cleared in order to return to a normal conversion mode. Otherwise, in step 67, the SAR controller 54 asserts the DEC signal to decrement the bit address counter 52, and the step is 62 in FIG. 4. In this fashion, all of the bits of the SAR register are successively cleared and conditionally set in order to adjust the current DAC so that and the excitation voltage $V_T$ becomes substantially equal to the reference voltage $V_R$.

Figure 5:
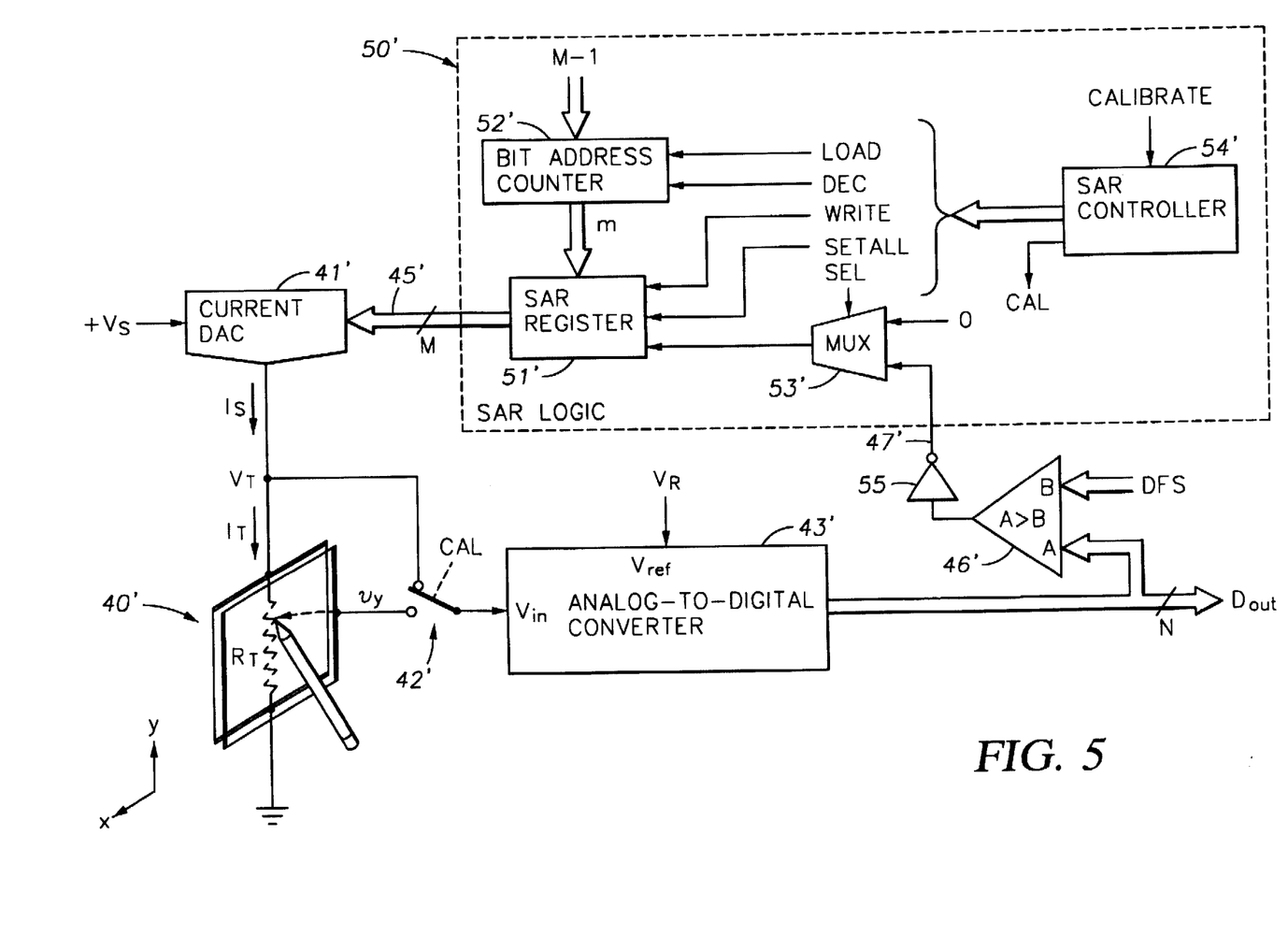
FIG. 5 is a schematic diagram showing an alternative construction for the circuitry in FIG. 3 so that the analog-to-digital conversion employed in the circuitry is not ratiometric.

The analog-to-digital converter 43 in FIG. 3 operates in a ratiometric mode. Alternatively, as shown in FIG. 5, the touch screen calibration system can be modified so that the analog-to-digital converter is operated in a non-ratiometric mode. Components in FIG. 5 that are similar to the components in FIG. 3 are designated with similar but primed reference numerals. FIG. 5 shows that the analog-to-digital converter 43' receives the reference voltage $V_R$ on its voltage reference input $V_{ref}$, and the analog multiplexer or switch 42' selects either the touch screen voltage $v_y$ during a normal conversion mode or the excitation voltage $V_T$ during the calibration mode. Moreover, in the calibration mode of the non-ratiometric system of FIG. 5, the digital output $D_{out}$ increases as the excitation voltage $V_T$ increases. Therefore, an inverter 55 is shown in FIG. 5 to invert the polarity of the comparison signal from the numerical comparator 46' so that the successive approximation procedure will adjust the excitation voltage $V_T$ to become substantially equal to the reference voltage $V_R$.

Figure 6:
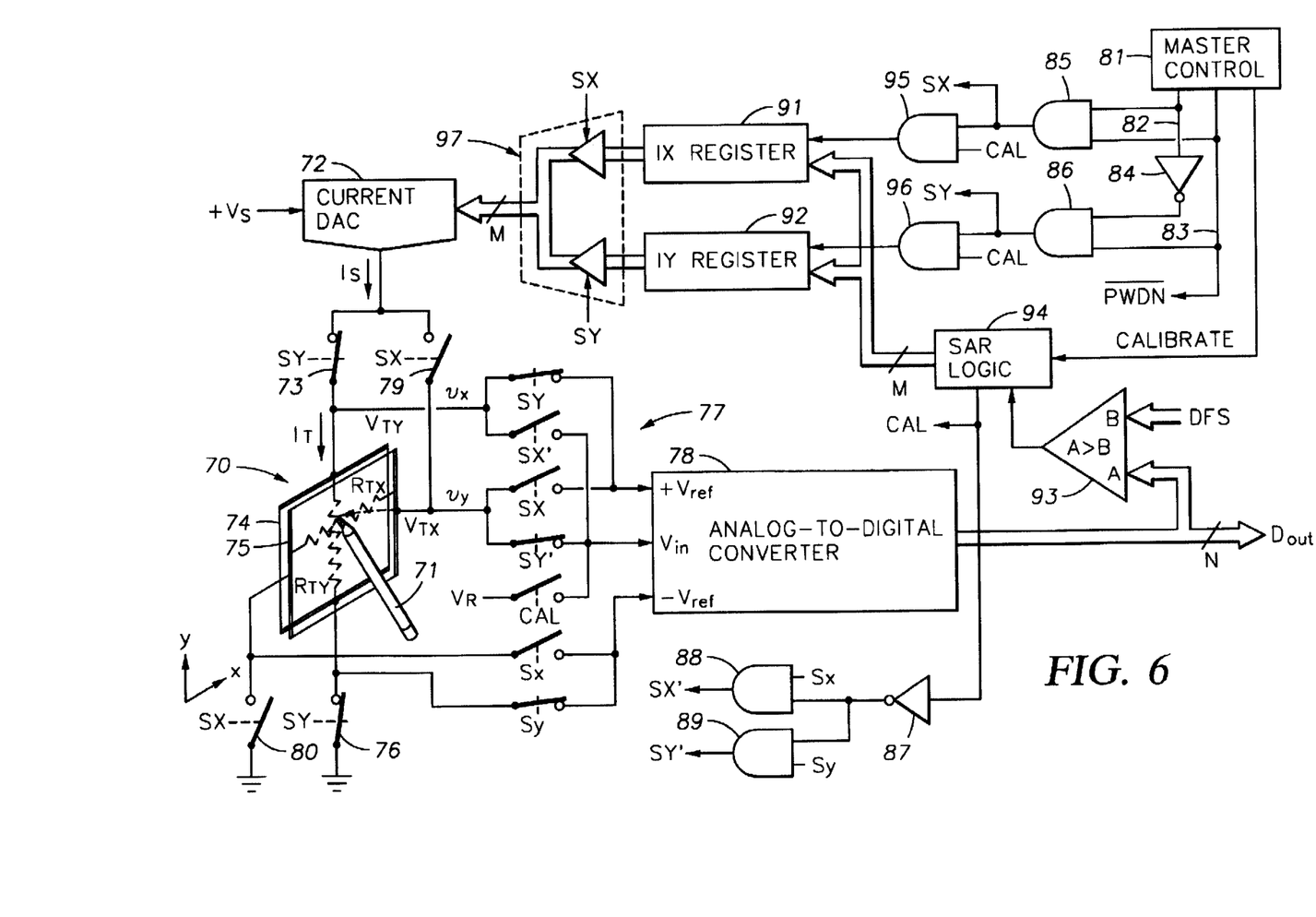
FIG. 6 shows an alternative construction for the circuitry in FIG. 3 so that the analog touch screen is time-division multiplexed to measure both an X coordinate and a Y coordinate.

Turning now to FIG. 6, there are shown modifications to the system of FIG. 3 to permit a touch screen 70 to indicate both the X and Y coordinates of the tip of a stylus 71 by employing time-division multiplexing. For example, to measure the Y coordinate, an excitation current $I_S$ from a current DAC 72 is directed through an electronic switch 73, passes through the touch screen resistance $R_{TY}$ of the lower sheet 74 of the touch screen, and passes to ground through an electronic switch 76, thereby generating a voltage $v_y$ on the upper sheet 75 of the touch screen 70 when the upper sheet 75 is depressed by the stylus 71 into contact with the lower sheet 74. As shown in FIG. 6, an analog multiplexer 77 applies the excitation voltage $V_{TY}$ to the positive reference voltage input +$V_{ref}$ of the analog-to-digital converter 78, and applies the screen voltage $v_y$ to the analog voltage input $V_{in}$ of the analog-to-digital converter. So that the voltage drop across the switch 76 will not introduce gain and offset errors in the analog-to-digital conversion process, the analog-to-digital converter 78 has a negative reference voltage input −$V_{ref}$ that is connected through the multiplexer 77 to the switch 76.

Alternatively, to measure the X coordinate of the stylus 71 on the touch screen 70, the current $I_S$ from the current DAC 72 would be directed by a switch 79 through the resistance $R_{TX}$ of the upper sheet 75 and to ground through a switch 80. Then the multiplexer 77 would apply the excitation voltage $V_{TX}$ to the positive reference voltage input $+V_{ref}$ of the analog-to-digital converter 78, apply the screen voltage $v_x$ to the analog input $V_{in}$ of the analog-to-digital converter, and apply the voltage drop across the switch 80 to the negative reference voltage input $-V_{ref}$. The analog switches 73 and 79 are PMOS-FET transistors or CMOS transmission gates, the analog switches in the analog multiplexer 77 are CMOS transmission gates, and the analog switches 76, 80 to ground are NMOS-FET transistors.

As shown in FIG. 6, a master control 81, such as a microprocessor, provides a control signal on a line 82 indicating that either an X or Y coordinate is to be determined, and a signal on a line 83 that enables the touch screen 70 to be energized. These signals are logically combined to provide decoded signals SX and SY indicating whether the touch screen 70 is energized for reading an X or a Y coordinate, as depicted by an inverter 84 and two AND gates 85 and 86. For control of the multiplexer 77, the signals SX and SY are further qualified by the CAL signal to produce control signals SX' and SY' where SX' has a logical value of "SX and not CAL", and SY' has a logical value of "SY and not CAL", as depicted by an inverter 87 and respective AND gates 88 and 89.

The resistance $R_{TY}$ of the bottom sheet 74 need not be the same as the resistance $R_{TX}$ of the top sheet 75. Even if the sheet resistivities of the indium tin oxide film were the same for both the top and bottom sheets, the resistances $R_{TY}$ and $R_{TX}$ would still be different for a touch screen having a rectangular shape. In view of the resistance variation between the top and bottom sheets, the calibration system of FIG. 6 performs a separate calibration for each of the top and bottom sheets. Therefore, the calibration system includes an IX register 91 for storing a digital control value for controlling the current DAC 72 when energizing the touch screen for an X coordinate measurement, and an IY register 92 for storing a digital control value for controlling the current DAC 72 for a Y coordinate measurement. Calibration for either the X coordinate measurement or the Y coordinate measurement uses the same numerical comparator 93 and SAR logic 94, which are constructed and operate as described above with respect to FIG. 3. During calibration, a respective one of the registers 91 or 92 is enabled by a respective one of the AND gates 95 or 96. Depending on whether an X or a Y coordinate is to be measured, the output of a respective one of the registers 91 or 92 is selected by a digital multiplexer 97 and applied to the current DAC 72.

Figure 7:
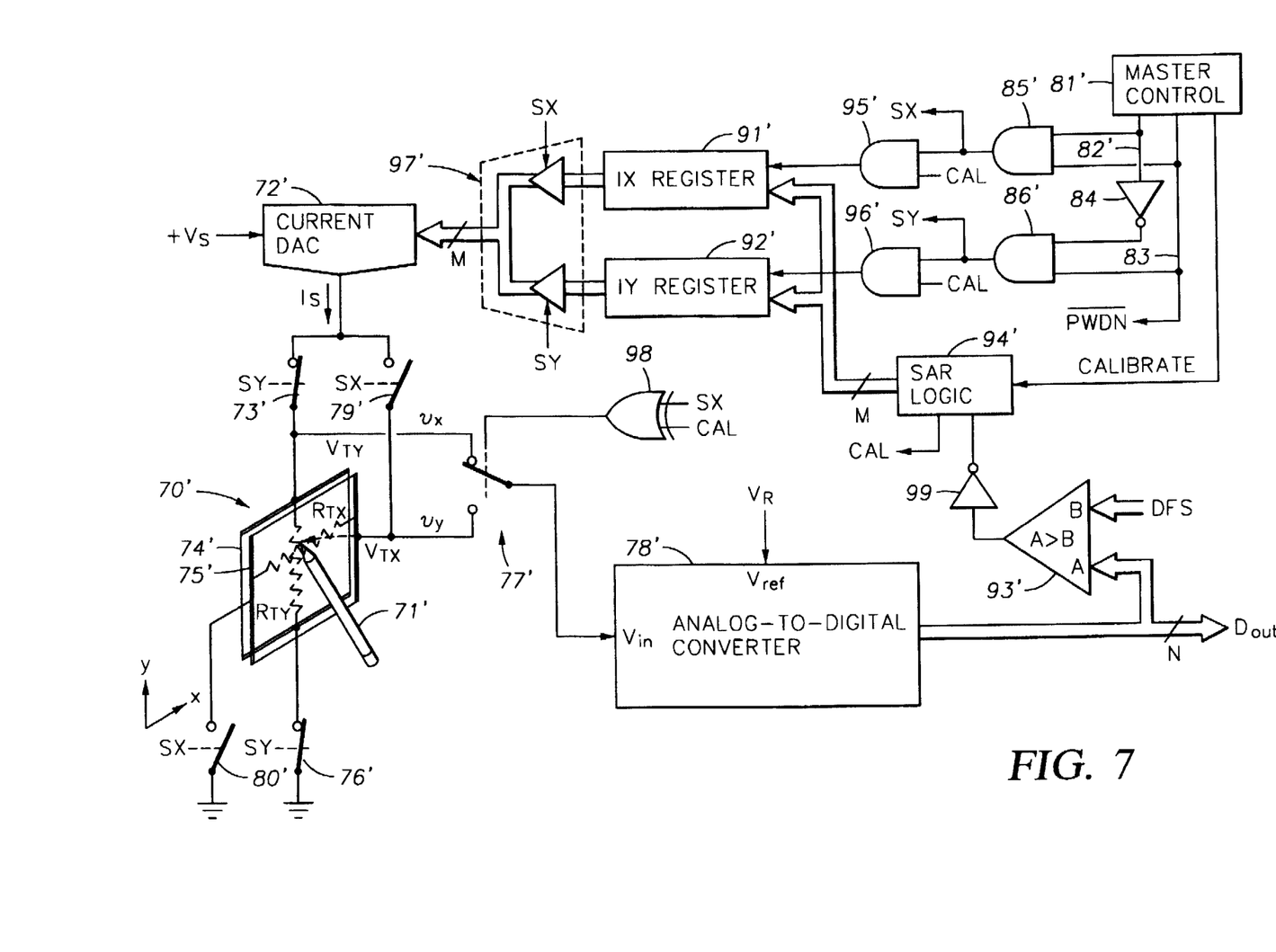
FIG. 7 shows a modification to the circuit of FIG. 6 so that the analog-to-digital conversion employed in the circuitry is not ratiometric.

Turning now to FIG. 7, there is shown a schematic diagram of a touch screen calibration system that is similar to the system of FIG. 6 but employs non-ratiometric analog-to-digital conversion. Components in FIG. 7 that are similar to components in FIG. 6 are designated with similar but primed reference numerals. In FIG. 7 the analog-to-digital converter 78' receives the reference voltage $V_R$ on its voltage reference input $V_{ref}$. The analog multiplexer 77' is considerably simplified; it is merely a single-pole, double-throw electronic switch, and the control signal for this electronic switch is the exclusive-OR of the CAL signal and a signal such as SX which selects energizing of either the lower sheet 74' or the upper sheet 75' of the touch screen 70', as indicated by the exclusive-OR gate 98 in FIG. 7. Moreover, the calibration system in FIG. 7 has an inverter 99 to invert the output of the numerical comparator 93' that functions in a fashion similar to the inverter 55 shown in FIG. 5.

Figure 8:
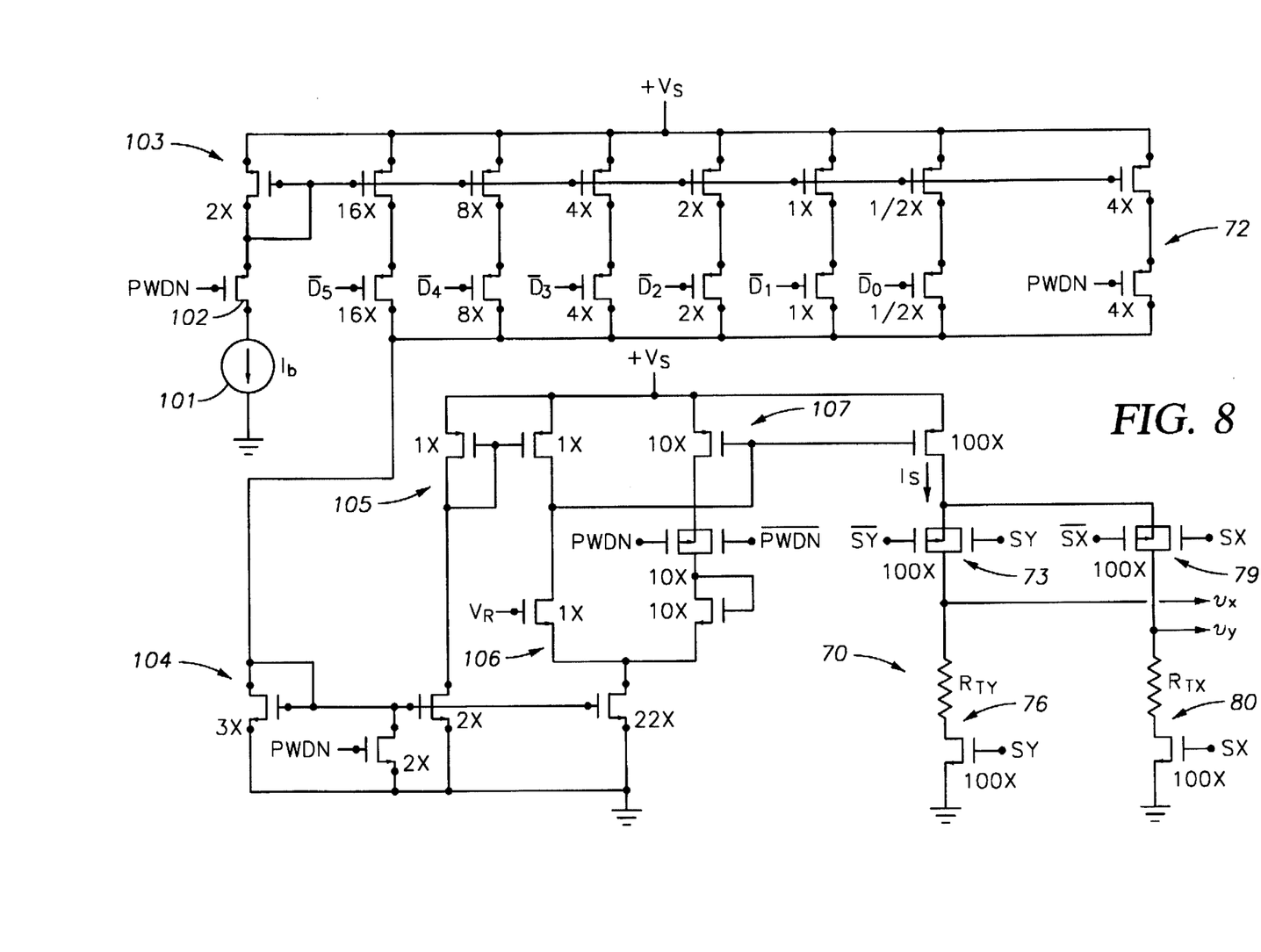
FIG. 8 is a schematic diagram showing the preferred construction for the current digital-to-analog converter (DAC) shown in any of FIGS. 3, 5, 6, or 7.

Turning now to FIG. 8, there is shown a schematic diagram for the current DAC 72 of FIG. 6. The same current DAC circuitry could be used for the calibration systems of FIGS. 3, 5 or 7. As shown in FIG. 8, the switches 73 and 79 connecting the current DAC 72 to the sheet resistances $R_{TX}$ and $R_{TY}$ are CMOS transmission gates, and the switches 76 and 80 are NMOS-FET transistors.

The current DAC 72 is biased by a current sink 101 unless the power down signal (PWDN) is asserted to disable an NMOS-FET transistor 102 that conducts the bias current from a current mirror generally designated 103. The current mirror 103 has a number of binary-scaled current outputs. The designations ½X, 1X, 2X, 4X, 8X, and 16X in FIG. 8 denote the relative scaling of the current outputs or transistor sizes with respect to a PMOS transistor having a standard size. The respective current outputs of the current mirror 103 are gated through respective PMOS transistors enabled by the respective digital control value data bits $D_0$, $D_1$, $D_2$, $D_3$, $D_4$, and $D_5$, all active low. In addition, the current mirror 103 has a current output of 4X gated by the power down signal PWDN so that when powered up, the current DAC supplies a minimum current that is about ⅛th of its maximum current. The gated current outputs are summed at a common node, and the total current is received by a current mirror generally designated 104. The current mirror 104 reflects the current from the current mirror 103 to a current mirror 105 which supplies the excitation current $I_S$ to the touch screen 70. The current mirror 104 boosts the total current from the mirror 103 by about a factor of 7, and the current mirror 105 boosts the current by an additional factor of about ten.

The current mirror 105 includes an amplifier 106 that compensates for current errors due to the low output impedance of the current DAC and thus provides improved rejection of power supply noise. When the supply voltage is varied, the corresponding variation in tablet current is matched by a matched device 107 having a relative size of 10X. The amplifier 106 reacts to keep this sensed current constant, and therefore reacts to keep this tablet current constant.

In view of the above, there has been described a method and system for calibrating a power supply for an analog resistive touch screen in such a way as to compensate for variations in touch screen sheet resistance and process parameters of low voltage CMOS integrated circuit technology. The power supply includes a current mirror that is efficient in regulating current to the touch screen, and an amplifier that provides good power supply noise rejection. In contrast to a voltage regulator, the load resistance provided by the touch screen is isolated from the amplifier, so that neither class A operation nor complex analog circuitry is required for ensuring stability. Calibration of the current supplied to the touch screen sets the excitation voltage to a value selected for high conversion resolution consistent with good power supply noise rejection.

We claim:

1. A method for controlling power supplied to a load resistance, the method comprising the steps of:
    converting a digital control value to a current supplied to said load resistance, to thereby produce a voltage across said load resistance;
    comparing said voltage across said load resistance to a desired voltage to produce a comparison signal; and
    adjusting said digital control value in response to said comparison signal so that said voltage across said load resistance becomes substantially equal to said desired voltage, wherein said digital control value is adjusted in response to said comparison signal by successively adjusting individual bits of said digital control value beginning with a more significant bit of said digital control value and ending with a less significant bit of said digital control value.

2. The method as claimed in claim 1, wherein said voltage across said load resistance is compared to the desired voltage by applying said voltage across said load resistance to an analog-to-digital converter to produce a digitized value, and producing said comparison signal from said digitized value.

3. The method as claimed in claim 2, which includes applying said voltage across said load resistance to an analog voltage input of said analog-to-digital converter, and applying a reference voltage to a reference voltage input of said analog-to-digital converter.

4. The method as claimed in claim 2, which includes applying said voltage across said load resistance to a reference voltage input of said analog-to-digital converter, and applying a reference voltage to an analog voltage input of said analog-to-digital converter.

5. The method as claimed in claim 2, wherein said comparison signal is produced from said digitized value by comparing said digitized value to a predetermined value.

6. The method as claimed in claim 1, wherein said step of converting a digital control value to a current supplied to said load resistance includes converting said digital control value to a control current and reflecting said control current in a current mirror supplying the current supplied to said load resistance, said current mirror having an amplifier controlling the current supplied to said load resistance.

7. A method for controlling power supplied to a load resistance, the method comprising the steps of:
   (a) converting a digital control value to a selected value of substantially constant current supplied by an adjustable substantially-constant current source to said load resistance, to thereby produce an excitation voltage across said load resistance;
   (b) applying said excitation voltage to an analog-to-digital converter to produce a digitized value responsive to said excitation voltage; and
   (c) adjusting said digital control value in response to said digitized value so that said excitation voltage becomes substantially equal to a desired voltage.

8. The method as claimed in claim 7, wherein said step (b) includes applying a reference voltage to an analog voltage input of said analog-to-digital converter, and applying said excitation voltage to a reference voltage input of said analog-to-digital converter.

9. The method as claimed in claim 7, wherein said step (c) includes comparing said digitized value to a predetermined value to produce a comparison signal, and successively adjusting individual bits of said digital control value in response to said comparison signal beginning with a more significant bit of said digital control value and ending with a less significant bit of said digital control value.

10. The method as claimed in claim 7, wherein said step of converting a digital control value to a current supplied to said load resistance includes converting said digital control value to a control current and reflecting said control current in a current mirror supplying the current supplied to said load resistance, said current mirror having an amplifier controlling the current supplied to said load resistance.

11. A method of operating an analog resistive touch screen having a screen resistance and producing a screen voltage indicating a selected location on the analog resistive touch screen, said method including the steps of:
   (a) converting a digital control value to a selected value of substantially-constant current supplied by an adjustable substantially-constant current source to said screen resistance, to thereby produce an excitation voltage across said screen resistance;
   (b) applying said excitation voltage to an analog-to-digital converter to produce a digitized value responsive to said excitation voltage;
   (c) adjusting said digital control value in response to said digitized value so that said voltage across said screen resistance becomes substantially equal to a desired voltage; and then
   (d) applying said screen voltage to said analog-to-digital converter to produce a digital output indicating said selected location on the analog resistive touch screen.

12. The method as claimed in claim 11, wherein said step (c) includes comparing said digitized value to a predetermined value to produce a comparison signal, and successively adjusting individual bits of said digital control value in response to said comparison signal beginning with a more significant bit of said digital control value and ending with a less significant bit of said digital control value.

13. The method as claimed in claim 11, wherein said step of converting a digital control value to a current supplied to said screen resistance includes converting said digital control value to a control current and reflecting said control current in a current mirror supplying the current supplied to said screen resistance, said current mirror having an amplifier controlling the current supplied to said screen resistance.

14. A method of operating an analog resistive touch screen having a first resistive sheet and a second resistive sheet, said first resistive sheet having a first screen resistance and producing a first screen voltage indicating an X coordinate of a selected location on the analog resistive touch screen, said second resistive sheet having a second screen resistance and producing a second screen voltage indicating a Y coordinate of the selected location on the analog resistive touch screen, said method including:
   (a) performing respective calibrations for each of said first resistive sheet and said second resistive sheet, said calibration for said first resistive sheet being performed by:
      (i) converting a first digital control value to a first current supplied to said first screen resistance, to thereby produce a first excitation voltage across said first screen resistance;
      (ii) applying said first excitation voltage to an analog-to-digital converter to produce a first digitized value responsive to said first excitation voltage;
      (iii) adjusting said first digital control value in response to said first digitized value to obtain an adjusted value for said first digital control value; and
      (iv) storing said adjusted value for said first digital control value in a first register; and
   said calibration for said second resistive sheet being performed by:
      (i) converting a second digital control value to a second current supplied to said second screen resistance, to thereby produce a second excitation voltage across said second screen resistance;
      (ii) applying said second excitation voltage to said analog-to-digital converter to produce a second digitized value responsive to said second excitation voltage;
      (iii) adjusting said second digital control value in response to said second digitized value to produce an adjusted value for said second digital control value; and
      (iv) storing said adjusted value for said second digital control value in a second register; and then (b) obtaining digital values of the X and Y coordinates of said selected location on said analog resistive touch screen, wherein the digital value of the X coordinate is obtained by:

(v) retrieving said adjusted value for said first digital control value from said first register;

(vi) converting said adjusted value for said first digital control value to said first current supplied to said first screen resistance, to thereby produce said first excitation voltage across said first screen resistance;

(vii) applying said first screen voltage to said analog-to-digital converter to produce said digital value of said X coordinate; and wherein the digital value of the Y coordinate is obtained by:

(v) retrieving said adjusted value for said second digital control value from said second register;

(vi) converting said adjusted value for said second digital control value to said second current supplied to said second screen resistance, to thereby produce said second excitation voltage across said second screen resistance; and    (vii) applying said second screen voltage to said analog-to-digital converter to produce said digital value of said Y coordinate.

15. A digitally-calibrated power supply comprising, in combination:

an adjustable substantially-constant current source for supplying current to a load resistance, said current causing a voltage to be produced across said load resistance, said adjustable substantially-constant current source having a digital-to-analog converter for adjusting said current in response to a digital control value;

a register for storing said digital control value, said register being connected to said digital-to-analog converter for providing the stored digital control value to said digital-to-analog converter;

comparator circuitry for comparing said voltage across said load resistance to a desired voltage to produce a comparison signal; and control logic connected to said register and to said comparator circuitry for adjusting said digital control value stored in said register in response to said comparison signal so that said voltage across said load resistance is adjusted toward said desired voltage.

16. The power supply as claimed in claim 15, wherein said system is constructed in a low-voltage CMOS integrated circuit, said low-voltage CMOS integrated circuit being powered by a power supply voltage of three volts or less.

17. The power supply as claimed in claim 15, wherein said comparator circuitry includes an analog-to-digital converter having an analog voltage input, a reference voltage input, and a digital output; one of said analog voltage input and said reference voltage input being connected for receiving said voltage across said load resistance and the other of said analog voltage input and said reference voltage input being connected for receiving a reference voltage, and said digital output being connected to said control logic to supply said comparison signal to said control logic.

18. The power supply as claimed in claim 17, wherein said comparator circuitry includes a numerical comparator having an input connected to said digital output of said analog-to-digital converter for producing said comparator signal by comparison of a digital value of said digital output to a digital full scale value of said analog-to-digital converter, said analog-to-digital converter producing said digital full scale value when said analog voltage input of said analog-to-digital converter receives a voltage substantially equal to a voltage received on said reference voltage input of said analog-to-digital converter.

19. The power supply as claimed in claim 15, wherein said current source includes an amplifier having an output regulating the current supplied to said load resistance.

20. The power supply as claimed in claim 15, wherein said control logic includes a successive approximation controller connected to said register for successively adjusting individual bits in said register in response to said comparison signal beginning with a more significant bit in said register and ending with a less significant bit in said register.

21. The power supply as claimed in claim 15, further comprising a plurality of electronic switches for connecting a selected one of a plurality of resistive loads to said current source, and which includes a register connected to said digital-to-analog converter for each electronic switch for storing a digital control value for controlling the current supplied by the current source through said each electronic switch to said selected one of a plurality of resistive loads.

22. A digitally-calibrated power supply comprising, in combination:

an adjustable substantially-constant current source for supplying current to a load resistance, said current causing a voltage to be produced across said load resistance, said adjustable substantially-constant current source including a digital-to-analog converter for adjusting said current in response to a digital control value, and an amplifier having an output regulating the current supplied to said load resistance;

a register for storing said digital control value, said register being connected to said digital-to-analog converter for providing the stored digital control value to said digital-to-analog converter;

an analog-to-digital converter having an analog voltage input, a reference voltage input, and a digital output; one of said analog voltage input and said reference voltage input being connected for receiving said voltage across said load resistance and the other of said analog voltage input and said reference voltage input being connected for receiving a reference voltage;

control logic connected to said register and to said digital output of said analog-to-digital converter for adjusting said digital control value stored in said register in response to said digital output of said analog-to-digital converter so that said voltage across said load resistance is adjusted toward said desired voltage.

23. The power supply as claimed in claim 22, wherein said system is constructed in a low-voltage CMOS integrated circuit, said low-voltage CMOS integrated circuit being powered by a power supply voltage of three volts or less.

24. The power supply as claimed in claim 22, which includes a numerical comparator having an input connected to said digital output of said analog-to-digital converter and a comparator output connected to said control logic for providing to said control logic a comparison signal indicating a comparison of a digital value of said digital output of said analog-to-digital converter to a predetermined value, said control logic including a successive approximation controller connected to said register for successively adjusting individual bits in said register in response to said comparison signal beginning with a more significant bit in said register and ending with a less significant bit in said register.

25. The power supply as claimed in claim 22, further comprising a plurality of electronic switches for connecting a selected one of a plurality of resistive loads to said current source, and which includes a register connected to said digital-to-analog converter for each electronic switch for storing a digital control value for controlling the current supplied by the current source through said each electronic switch to said selected one of a plurality of resistive loads so that the current supplied by said current source to each of said plurality of resistive loads produces a voltage that is substantially equal to said desired voltage.

26. A power supply and electronic interface for an analog resistive touch screen having a screen resistance and producing a screen voltage indicating a selected location on the analog resistive touch screen, said power supply and electronic interface comprising, in combination:

an adjustable substantially-constant current source for supplying current to said screen resistance, said current causing an excitation voltage to be produced across said screen resistance, said adjustable substantially-constant current source including a digital-to-analog converter for adjusting said current in response to a digital control value, a register for storing said digital control value, said register being connected to said digital-to-analog converter for providing the stored digital control value to said digital-to-analog converter;

an analog-to-digital converter having an analog voltage input, a reference voltage input, and a digital output;

an analog multiplexer connected to said analog voltage input of said analog-to-digital converter and responsive to a calibration mode signal for providing said screen voltage to said analog voltage input during a normal mode of operation and for providing one of a reference voltage and the excitation voltage to said analog voltage input during a calibration mode of operation, and for providing the other one of said reference voltage and excitation voltage to said reference voltage input of said analog-to-digital converter during said calibration mode, and control logic connected to said register and to said digital output of said analog-to-digital converter for adjusting said digital control value in said register in response to said digital output of said analog-to-digital converter during said calibration mode so that said voltage across said screen resistance is adjusted toward said desired voltage during said calibration mode.

27. The power supply and electronic interface as claimed in claim 26, which includes a numerical comparator having an input connected to said digital output of said analog-to-digital converter for producing a comparator signal by comparison of a digital value of said digital output to a digital full scale value of said analog-to-digital converter, said analog-to-digital converter producing said digital full scale value when said analog voltage input of said analog-to-digital converter receives a voltage substantially equal to a voltage received on said reference voltage input of said analog-to-digital converter, said control logic being responsive to said comparator signal during said calibration mode for adjusting said digital control value stored in said register during said calibration mode so that said excitation voltage across said screen resistance is adjusted to be substantially equal to said reference voltage.

28. The power supply and electronic interface as claimed in claim 26, wherein said power supply and electronic interface is constructed in a low-voltage CMOS integrated circuit, said low-voltage CMOS integrated circuit being powered by a power supply voltage of three volts or less.

29. The power supply and electronic interface as claimed in claim 26, wherein said current source includes an amplifier having an output regulating the current supplied to said screen resistance.

30. The power supply and electronic interface as claimed in claim 26, wherein said control logic includes a successive approximation controller connected to said register for successively adjusting individual bits in said register beginning with a more significant bit in said register and ending with a less significant bit in said register.

31. The power supply and electronic interface as claimed in claim 26, further comprising a first electronic switch for connecting said current source to a first resistive sheet of said analog resistive touch screen for producing an excitation voltage across the first resistive sheet and a screen voltage indicating an X coordinate of said selected location on the analog resistive touch screen, and a second electronic switch for connecting said current source to a second resistive sheet of said analog resistive touch screen for producing an excitation voltage across the second resistive sheet and a screen voltage indicating a Y coordinate of said selected location on the analog resistive touch screen; and wherein said power supply and electronic interface includes a first register connected to said digital-to-analog converter and to said control logic for storing a first digital control value for controlling the current supplied by the current source through said first electronic switch to said first resistive sheet for producing a screen voltage indicating an X coordinate of said selected location on the analog resistive touch screen, said power supply and electronic interface includes a second register connected to said digital-to-analog converter and said control logic for storing a second digital control value for controlling the current supplied by the current source through said second electronic switch to said second resistive sheet for producing a screen voltage indicating a Y coordinate of said selected location on the analog resistive touch screen, and wherein said analog multiplexer includes analog switches for selection of the excitation voltage from either the first sheet or the second sheet during the calibration mode, and for selection of the screen voltage from either the first sheet or the second sheet during the normal conversion mode.

32. The power supply and electronic interface as claimed in claim 31, further comprising a third electronic switch for connecting an edge portion of said first resistive sheet of said analog resistive touch screen to ground when said first electronic switch connects said first resistive sheet to said current source, and a fourth electronic switch for connecting an edge portion of said second resistive sheet of said analog resistive touch screen to ground when said second electronic switch connects said second resistive sheet to said current source, and wherein said analog-to-digital converter has a negative reference voltage input, and said analog multiplexer has electronic switches for electrically connecting said edge portion of said first resistive sheet to said negative reference voltage input when said first electronic switch connects said current source to said first resistive sheet, and for electrically connecting said edge portion of said second resistive sheet to said negative reference voltage input when said second electronic switch connects said current source to said second resistive sheet.

* * * * *